Sept. 18, 1956 R. F. WERNLUND 2,763,781
ELECTRONIC CONTROL APPARATUS
Filed June 11, 1952 2 Sheets-Sheet 1
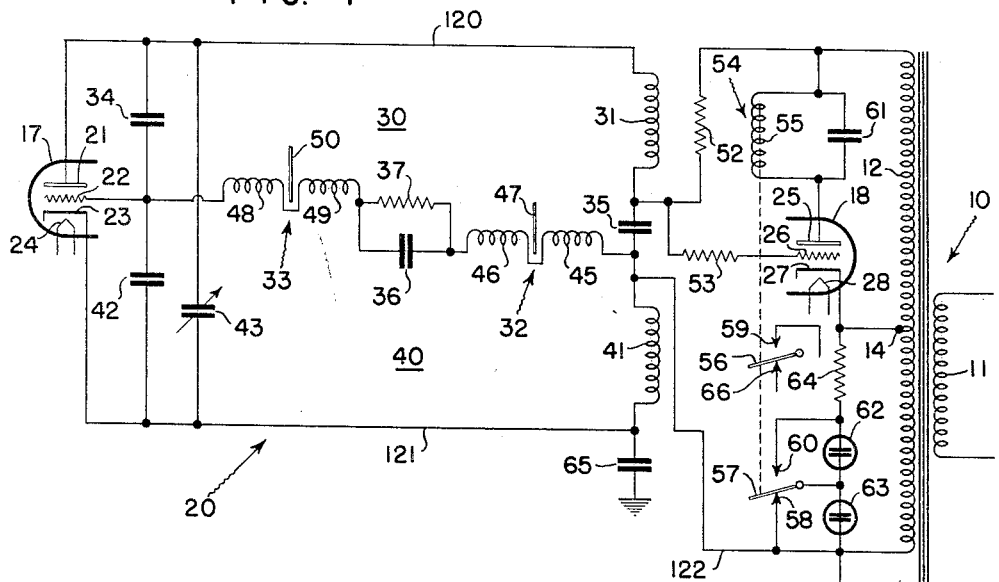
INVENTOR.
ROGER F. WERNLUND
BY Arthur H. Swanson
ATTORNEY.

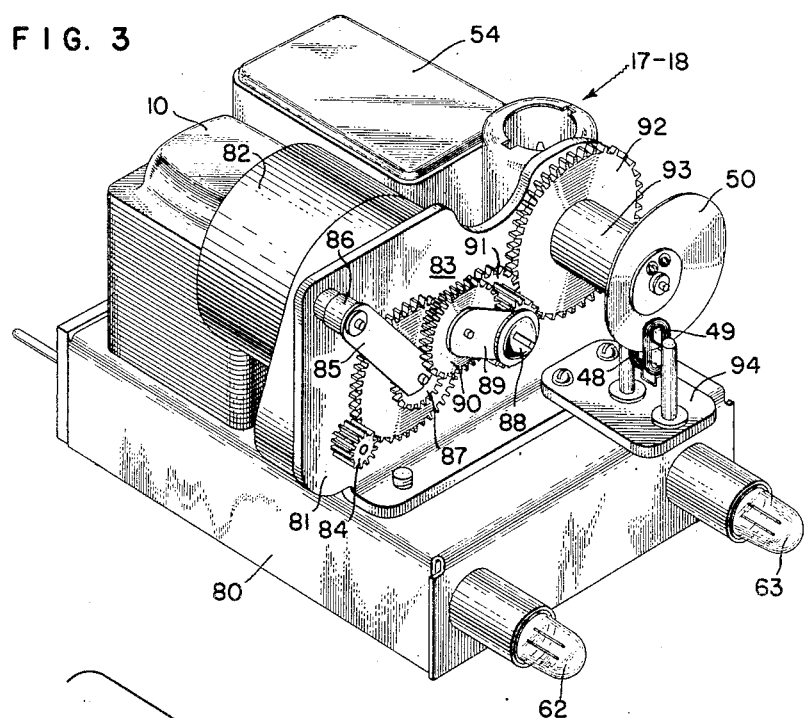
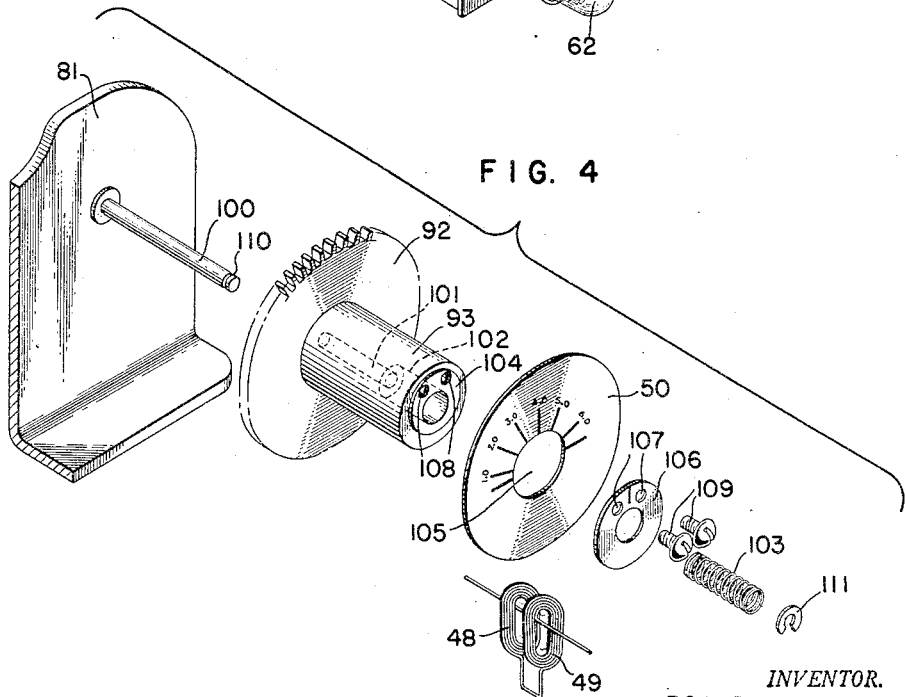

United States Patent Office 2,763,781
Patented Sept. 18, 1956

2,763,781

ELECTRONIC CONTROL APPARATUS

Roger F. Wernlund, Southampton, Pa., assignor to Minneapolis-Honeywell Regulator Company, Minneapolis, Minn., a corporation of Delaware Application June 11, 1952, Serial No. 293,012

7 Claims. (Cl. 250—36)

A general object of the present invention is to provide a new and improved control apparatus of the type wherein variations in a control variable are used to cause a control oscillator to go into and out of oscillation and wherein the control apparatus will effect periodic operation of a variable maintaining means in order to maintain the magnitude of the control variable at a desired value. More specifically, the present invention is concerned with a new and improved control apparatus of the type wherein a control variable is arranged to position a vane with respect to a pair of coils in an oscillator circuit and a second vane is periodically positioned with respect to a further set of coils in the oscillator circuit so as to cause the oscillator circuit to be periodically operative when the magnitude of the control variable is within a predetermined range of a preselected control point and wherein said range may be adjusted within the control apparatus.

In the control of the magnitude or value of certain variables it is often necessary to sense the changes in the magnitude of the controlled variable and operate a control relay whenever the magnitude deviates from a preselected control point. In order to maintain the value of the control variable at a preselected control point, it has been proposed to use highly sensitive sensing elements and control devices. One such device is disclosed in the copending application of Warren Moore, Jr., Serial No. 106,796, filed July 26, 1949, now Patent No. 2,647,252, issued July 28, 1953. The circuit configuration of the Moore application is a highly sensitive and accurate control of an oscillator circuit and produces "on" and "off" operation of a control relay. In using such a highly sensitive apparatus as disclosed in the Moore application, in certain types of control configurations, there is a tendency for the controlled variable to hunt about the preselected control point. It has been found that the elimination of this hunting condition may be effected by varying the "on-off" time of the control relay in accordance with the deviation of the controlled variable from the preselected control point. Periodic operation of the control relay will be had as long as the control variable does not deviate from the control point by more than a predetermined amount. The band or range in which this periodic operation is present is sometimes referred to as the proportioning band of the control apparatus. If the magnitude of the variable falls within the proportioning band, the control relay of the apparatus will be operated for periodic intervals depending upon how far the magnitude of the variable deviates from the control point. If the magnitude falls outside of the proportioning band, the control relay will operate continuously. One of the problems in utilizing a control device of the present type, wherein periodic operation is desired within the proportioning band, is the provision of a proportional band adjustment. Adjustments of the proportioning band are required if the control apparatus is to have wide application. Such a proportioning band adjustment for the control apparatus must be simple, so that it can be readily adjusted in the field, and accurate. The proportioning band adjustment must also be of the type which will not be subject to change or drifting after the apparatus containing the same has been in the field for a length of time.

It is therefore an object of the present invention to provide a new and improved electrically variable control device having a proportioning band adjustment.

Another object of the present invention is to provide a new and improved vane controlled oscillator wherein one of the vanes associated with the oscillator is periodically rotated and is mounted so as to have an adjustable throw of the outer surface thereof to give an adjustable proportioning band so that the operation of the control apparatus will be periodic whenever the magnitude of the control variable falls within said adjustable proportioning band.

A further object of the present invention is to provide a new and improved adjustable variable inductive element for an electric control device wherein a pair of coils are arranged to have their mutual coupling varied by an eccentrically mounted metallic vane.

A still further object of the present invention is to provide an adjustably variable impedance element having a rotating shaft with an eccentric hub thereon arranged to receive a metallic vane having an eccentric hole therein with the eccentricities of the hub and the vane arranged to cancel when they are in one position and when in a second position the eccentricities are arranged to add so as to vary the throw of said vane from a minimum to a maximum when said vane is adjusted relative to said shaft.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which there is illustrated and described a preferred embodiment of the invention.

Of the drawing:

Figure 1 is a schematic showing of one form that the electrical circuit may assume;

Figure 2 is a diagrammatic showing of how a galvanometer may be associated with a control apparatus as applied to a particular control problem;

Figure 3 is a mechanical showing of elements included in the apparatus for effecting periodic operation thereof; and Figure 4 is an exploded view of a portion of the apparatus shown in Figure 3.

Referring now to Figure 1, the numeral 10 represents a source of power for the control apparatus and comprises a transformer having a primary winding 11, a secondary winding 12 and a secondary winding 13. The secondary winding 12 is tapped at 14 and the secondary winding 13 is tapped at 15. The secondary winding 12 supplies power to a pair of electron discharge devices 17 and 18, which devices may be within a common envelope. The discharge device 17 acts as a driving device for an electronic oscillator 20 and this device comprises an anode 21, control electrode 22, cathode 23, and a heater 24 which is arranged to heat the cathode 23 to be electron emissive. The electronic device 18 comprises an anode 25, a control electrode 26, a cathode 27, and a heater 28 which is arranged to heat the cathode 27 to be electron emissive.

The electronic device 17 has an output resonant circuit 30 connected to the anode thereof and this output resonant circuit includes an inductive element 31, a pair of variable inductive elements 32 and 33 and a pair of condensers 34 and 35. Also connected in this output resonant circuit although not forming an effective part of the resonant circuit is a condenser 36 and a resistor 37 which is connected in parallel therewith and between the variable inductive elements 32 and 33.

The input resonant circuit for the electronic device 17 is indicated at 40 and includes as a part thereof the common inductive elements 32 and 33 of the output resonant circuit as well as an inductive element 41 and a condenser 42. An adjustable condenser 43 is connected between the anode 21 and the cathode 23. The variable inductive element 32 comprises a pair of mutually inductive coils 45 and 46 with a vane 47 arranged to pass therebetween. The variable inductive element 33 comprises a pair of mutually inductive coils 48 and 49 with a vane 50 arranged to pass therebetween.

Associated with the input of the electronic device 18 is a resistor 52 and a grid resistor 53. Positioned in the output circuit of the device 18 is a relay 54 having a relay winding 55 which is arranged to move a pair of switch blades 56 and 57. The blade 57 is normally biased into engagement with an associated contact 58 by means not shown and the blade 56 into engagement with a contact 66, when the relay coil 55 is effectively deenergized. When the relay coil is energized, the blade 56 will engage an associated contact 59 and the blade 57 will engage an associated contact 60. A condenser 61 is connected in parallel with the relay coil 55.

A pair of gaseous discharge devices 62 and 63 are arranged to indicate the position of the relay switch blade 57 and these gaseous discharge devices have connected in series therewith, for current limiting purposes, a resistor 64. A condenser 65 is provided for bypassing unwanted signals originating in the oscillator circuit.

Before considering the overall operation of the apparatus shown in Figure 1, reference should be made to Figure 2 as well as Figures 3 and 4. Considering Figure 2 first, there is shown the vane 47. This vane 47 is arranged to be positioned by a suitable galvanometer movement 70 which may have the actuating current supplied thereto by a thermocouple element 71 positioned within an electric furnace 72. Variations in the thermocouple output will indicate variations in the temperature within the furnace and these variations will be effective to cause the galvanometer 70 to move the vane 47 with respect to the coils 45 and 46 to vary the coupling therebetween and therefore vary their effective impedance in the electrical circuit.

Shown in Figure 3 is a unitary plug-in device which incorporates certain of the electrical apparatus shown in Figure 1 and comprises a main chassis 80 on which are mounted the transformer 10 and relay 54 as well as the electrical enclosure for electronic devices 17 and 18. Also mounted on the top side of the chassis 80 is a frame member 81 which has a motor 82 fastened on one side thereof and a gear train 83 on the other side thereof to serve as a driving connection between the motor 82 and the vane or disk 50. A spur gear 84 serves as the connecting means between the gear train 83 and the motor 82.

The gear train 83 is retained in position by a resilient blade 85 which is rigidly fastened to a support member 86 and has the other end thereof depressing gears 87 on a spindle which is fastened to the frame. Also retaining the gear train in position is a screw threaded member 88 which is rigidly fastened to the frame 81 and which carries, by way of a supporting link 89, a gear 90. The link 89 also carries a smaller gear adjacent to the gear 90 on the inner side thereof, not shown, and this inner gear is arranged to engage the gear 87. The gear 90 in turn drives a pair of gears 91, the latter of which act as a driving and spur gear for the gear 92 which is rigidly fastened to a shaft 93, the latter of which carries the vane 50. A plate 94 is rigidly fastened to a horizontal portion of the frame member 81 and carries the coils 48 and 49.

Figure 4 shows the driving and supporting means for the vane 50 and has been shown in exploded view in order to facilitate explanation. The gear 92 and the shaft 93 are rigidly fastened together and the shaft 93 has a hole 101 extending along the longitudinal axis thereof so that the same may fit over the spindle 100. The shaft 93 also has the hole 101 enlarged on the outer end thereof at 102 so as to be able to receive a resilient member in the form of a spring 103. The shaft 93 on the outer end thereof has a raised hub 104 of circular section having the center thereof displaced from the center of the shaft 93 by a predetermined amount so as to make the hub 104 eccentric with respect to the center of the shaft 93. The vane 50 has a hole 105 therethrough of a cross section slightly larger than the hub 104 on the shaft 93. This hole 105 is of circular section and is likewise displaced from the geometrical center of the vane 50 by a predetermined amount. The amount of displacement of the center of the hole 105 with respect to the center of the vane 50 corresponds to the amount of offset of the center of the hub 104 from the center of the shaft 93. A washer 106 is arranged to fit over the hole 105 of the vane 50 with holes 107 in the washer 106 to be arranged to line up with corresponding holes 108 in the shaft 93. A pair of screws 109 are arranged to fasten the washer 106 and the vane 50 to the shaft 93. When the screws 109 have been placed within the holes 108 and tightened down, the washer 106 will be rigidly holding the vane 50 in position on the shaft 93.

In order to hold the shaft 93 on the spindle 100, it will be noted that the spindle 100 has a recess 110 in the outer end thereof and this recess is adapted to receive a clip or locking member 111. When the shaft 93 is placed over the spindle 100 and moves so that the gear 92 is adjacent to frame 81, the spring 103 will be fit within the shaft 93 into the hole 102 and will be depressed so that the clip 111 may be depressed into the recess 110 on the spindle 100. With this arrangement it is possible to provide liberal manufacturing tolerances and still maintain the vane 50 in a relatively fixed position since the spring 103 will always retain the gear 92 and the shaft 93 in a fixed position against the frame 81.

From the apparatus set forth in Figure 4 it will be seen that the throw of the vane 50 may be varied. Thus, when the offset distance of the vane 50 is added to the offset distance of the hub 104, there will be a maximum throw or a maximum eccentricity of the assembly. Further, when the offset of the vane 50 is positioned so as to cancel the offset of the hub 104 there is a minimum throw in the outer surface of the vane 50. If the offset distances of the two devices are equal, there will be zero throw of the vane 50 and it will act as though it were centrally mounted on the shaft 93. Considering this in terms of the vane coils 48 and 49, when the vane is set so as to have maximum throw, there will be a maximum variation in the coupling between the coils 48 and 49. When the vane 50 and the hub 104 are set so that their offset portions cancel, there will be substantially zero change in the coupling between the coils 48 and 49 as the vane 50 rotates.

In order to facilitate the adjustment of this vane with respect to the shaft 93 the vane 50 carries calibration marks which cooperate with an indexing mark on the washer 106 between the holes 107. When the indexing mark on the washer 106 is set in alignment with the vane mark 3.0 the proportioning band of the control apparatus will be approximately 3%. If the indexing mark and the vane 50 are arranged so that the mark is at the position of 1.0 of the vane, there should be a 1% proportioning band of the associated control apparatus. This will be better understood upon considering the operation of the entire apparatus which follows.

In considering the overall operation of the apparatus, reference should be made first to Figure 1. With the apparatus in the position shown in Figure 1, the relay 54 will be in a deenergized position. The reason that the relay 54 is deenergized will be understood when it is noted that the vane 50 is effectively between the coils 48 and 49 so that the inductive element 33 has a relatively low impedance. Likewise, the vane 47 is between the coils 45 and 46 so that the inductive element 32 has a relatively low impedance. With both of the elements 32 and 33 having a relatively low impedance the coupling between the output resonant circuit 30 of the electronic device 17 and the input resonant circuit 40 will be less than a predetermined critical value which will sustain oscillation. This will mean that the oscillator circuit 20 will not be oscillating and there will be an appreciable amount of current drawn by the electronic device 17.

The current for the device 17 may be traced from the upper terminal of the secondary 12 through the resistor 52, inductance 31, conductor 120, anode 21, cathode 23, conductor 121, coil 41, and conductor 122 to the lower terminal of the secondary 12. The resultant current flow through the electronic device 17 will cause a voltage drop across the resistor 52 and this voltage drop will be applied to the control electrode 26 of the electronic device 18. This voltage drop will establish, during the positive or conducting half cycle of the electronic device 18, a negative biasing potential on the control electrode 26 and this biasing potential will be sufficient to maintain the current flow through the discharge device 18 below the value necessary to energize the relay 54.

When the relay is deenergized the switch blade 57 will be engaging contact 58 so that the gaseous discharge device 63 will be short circuited and will be extinguished. On the other hand, the discharge device 62 will not be short circuited and the glow thereon will indicate that the relay is in a deenergized position. Likewise the switch blade 56 will be out of engagement with the contact 59 so that, referring to Figure 2, there will be no electrical energy supplied to the heater in the electrical furnace 72. The blade 56 will be engaging contact 66 which may be used to control cooling apparatus if such is desired. As long as the temperature within the furnace remains above the set point, the apparatus will stay in the position shown in the figure.

Assume now that the magnitude of the control variable has deviated from its previous position by a considerable amount so that the vane 47 is no longer between the coils 45 and 46. If the movement of the vane 47 with respect to the coils 45 and 46 is sufficient, the relative position of the vane 50 with respect to the coils 48 and 49 will have no effect upon the operation of the control apparatus inasmuch as the vane 50 and the coils 48 and 49 are designed so as not to have as great an effect upon the oscillator circuit as the coils 45 and 46 and the respective vane 47. Thus, with the vane 47 removed from the coils 45 and 46 there will be mutual coupling between the coils so that the coils present a relatively high impedance and there will be sufficient feedback signal into the input of the discharge device 17. With this greater than the critical value of feedback signal present the oscillator circuit 20 will be oscillating and there will be a tendency for the control electrode 22 to become positive due to the regenerative feedback signal from the oscillator resonant circuits. This positive signal will cause grid current to flow which will be effective to charge the condenser 36. The charge upon the condenser 36 will be sufficient to maintain the current flow through the electronic device 17 at a relatively low value so that there is no appreciable current flow drawn by the device 17 through the resistor 52. With relatively little voltage drop across the resistor 52 the control electrode 26 will be effectively connected to the upper terminal of the secondary winding 12 so that the electronic device 18 will draw an appreciable amount of current. This current flow may be traced from the upper terminal of the secondary 12 to the relay coil 55, anode 25, cathode 27, back to the center tap 14 of the secondary 12. The current flow will be sufficient to energize the relay 54 so that the blade 57 engages contact 60 and the blade 56 engages contact 59. When the blade 57 engages contact 60, the gaseous device 62 will be short circuited so as to extinguish the glow thereon and the gaseous device 63 will have the short circuit removed therefrom so that now it will be in a position to glow to indicate that the relay 54 is in the energized position. When the blade 56 engages the contact 59 an electrical circuit is completed to the heater in the furnace 72 so that heat will be applied thereto. As long as the apparatus remains with the vane 47 considerably removed from the coils 45 and 46, the relay 54 will stay in an energized position so as to supply heat to the furnace 72.

As the temperature in the furnace 72 begins to rise and approach the desired control point, the vane 47 will begin to move between the coils 45 and 46. As soon as the temperature within the furnace 72 is within a predetermined range of the control point of the apparatus the cyclic operation of the vane 50 will become effective to cause periodic operation of the relay 54. The point at which the periodic operation of the vane 50 becomes effective will be determined upon the proportioning band adjustment made in the control apparatus. In other words, referring to Figure 4, the proportioning band will be determined by the setting of the vane 50 upon the hub 104 so that the throw of the vane 50 will be effective to produce periodic operation of the control relay 54 when the magnitude of the control variable deviates from the control point by a predetermined amount. The proportional band is generally referred to as a percent of full scale range of indication. Thus, with a 3% proportional band on a 1000° C. range, the proportional band would be 30° C. This is 15° C. on either side of the set point. Thus, if the magnitude of the control variable is within 1½% of the set point of the associated measuring instrument with the vane positioned so as to give proportioning operation at 1½% as the vane 50 is cyclically rotated by the operation of the motor 82, the vane will vary the inductance of the inductive element 33 so as to cause the oscillator to go into and out of oscillations. If the magnitude of the control variable is within 1½%, and the proportioning band adjustment is set for 3%, the vane 50 will just become ecective. Thus for relatively short intervals during each cyclic operation of the vane the coupling between the coils 48 and 49 and the resultant impedance of the inductive element 33 will be relatively low and the oscillator will go out of oscillation so that the resultant current flow through the resistor 52 will cause the relay 54 to be deenergized. The "off" periods of the relay 54 will be relatively small.

As the magnitude of the control variable approaches the set point so that the magnitude of the control variable is well within the 3% proportioning band, the time lengths of operation of the relay 54 will be decreased. In other words, with the control variable closer to the control point the vane 47 will be closer within the coils 45 and 46 so that a lesser change is required in the inductive element 33 in order to effect non-oscillation of the control apparatus. Thus, the vane 50 for a longer period during each rotating cycle thereof will maintain the impedance of the inductive element 33 at a sufficiently low value to maintain the oscillating circuit 20 non-oscillatory and the relay 54 in a deenergized position.

It can thus be seen that when the magnitude of the control variable is within the proportioning band of the apparatus that there will be periodic or cyclic operation of the control relay and that the periods of operation of the control relay will be directly dependent upon the deviation of the magnitude of the control variable from the desired set point. In order to change the proportioning band of the apparatus it is but necessary to loosen the screws 109 and rotate the vane 50 with respect to the hub 104 so as to vary the effective throw of the vane 50 and therefore the magnitude of the inductive change of the coils 48 and 49 as the vane 50 rotates therebetween.

The cyclic operation of the vane 50 may be increased or decreased by changing the positions of the gears within the gear train 83. This may also be done by substituting other gears in place of the gears that are shown in Figure 3. It has been found that the cycle time for the vane 50 should preferably fall between three seconds and seventy-two seconds. Obviously, other cycle times can be provided depending upon the particular application wherein the control device is to be utilized.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A vane controlled oscillator circuit comprising, an electrical oscillating circuit having a pair of inductive devices therein for controlling the oscillation of said oscillating circuit, each of said inductive devices having a pair of co-operating coils and a vane associated therewith, current responsive means connected to respond to the oscillatory or non-oscillatory condition of said circuit, control means for varying the position of one of said vanes in respect to one of said inductive devices in accordance with variations in a control variable, periodically operating means for positioning the other vane with respect to the other inductive device so that when the magnitude of the control variable is within a predetermined range of a set point the periodically operating vane will cause the oscillating circuit to go into and out of oscillation, and means for varying said predetermined range, the last mentioned means comprising an eccentrically mounted vane mounted on a continuously rotatable shaft having a hub thereon which is eccentric from the center of said shaft and arranged to retain the last mentioned vane on said hub with said last mentioned vane being relatively movable with respect to said hub to vary the effective throw of said last mentioned vane as said shaft rotates.

2. In an electrical control circuit, the combination comprising, an electrical oscillator having therein a variable impedance element, means for cyclically varying the impedance of said element comprising a metallic disc having therein a hole which is off-centered from the center of said disc, a drive shaft having an eccentric hub on the end thereof which is adapted to fit within the hole in said disc and being adjustable with respect to said disc so that when the disc is in one relative position with respect to said shaft there will be a maximum variation in the movement of the outer edge of said disc as said shaft rotates with said disc clamped thereto and when said disc is moved to a second position relative to said shaft there will be a minimum variation in the movement of the edge of said disc as said shaft rotates with said disc rigidly fixed thereto.

3. A variable electrical inductive element for an electronic oscillating apparatus comprising, motor means for continuously driving a circular vane between a pair of fixed mutually inductive coils by means of a drive shaft having an off-centered hub thereon, said vane having an off-centered mounting hole therein arranged to fit over said off-centered hub, said vane being relatively movable with respect to said hub to vary the throw of said vane as said motor means operates, and means for rigidly fastening said vane with respect to said hub.

4. A periodically variable inductive element comprising, a rigid frame member having fixed thereto a spindle and a pair of mutually inductive coils, a rotatable hollow shaft mounted upon said spindle and having an off-centered hub formed on the outer end thereof away from said frame, a circular metallic vane having an off-centered hole therein adapted to be mounted upon said off-centered hub and being relatively movable with respect to said hub so that the throw of the external edge of said vane may be varied, and a plate arranged to clamp said vane on said shaft, said vane when clamped to said shaft with said shaft fastened on said spindle having the surface thereof arranged to pass between said mutually inductive coils to vary the electrical coupling therebetween.

5. Apparatus as set forth in claim 4 wherein said shaft is mounted upon said spindle and is forced against said frame by resilient means acting between said shaft and a clamping means on the end of said spindle.

6. Apparatus as set forth in claim 4 wherein said shaft is arranged to be continuously rotatively driven by motor means rigidly fastened to said frame through a plurality of gear members which may be reversibly positioned to change the speed of rotation of said shaft and therefore the speed at which said vane passes between said coils.

7. A periodically variable inductive element for an electronic control circuit comprising, a rotatable shaft adapted to be continuously rotated and having a hub on the end thereof which is positioned off-center of said shaft by a predetermined amount, a circular metallic disc having a hole therein which is off-centered from the center of said disc by said predetermined amount, said disc being arranged to have the hole therein fit over said off-centered hub and being relatively adjustable with said hub so that when in a first position the off-centered amount of said hub will be cancelled by the off-centered distance of said disc so that as said disc rotates the external surface thereof will have no change in throw and when in a second position wherein the off-centered distance of said hub adds to the off-centered distance of said disc, said disc when rotated by said shaft will have a maximum change in throw in the external surface thereof, a pair of mutually inductive coils having a space therebetween, and means mounting said coils so that said disc may pass therebetween and vary the coupling between said coils by an amount determined by the relative position of said disc with respect to said shaft.

References Cited in the file of this patent

UNITED STATES PATENTS

| | | |
|---|---|---|
| 2,075,125 | Mabry et al. | Mar. 30, 1937 |
| 2,468,138 | Terry | Apr. 26, 1949 |
| 2,530,109 | Wild | Nov. 14, 1950 |
| 2,542,416 | Kach et al. | Feb. 20, 1951 |

FOREIGN PATENTS

| | | |
|---|---|---|
| 930,994 | France | June 4, 1952 |
| | (Addition to No. 55,939) | |